Patented Sept. 4, 1945

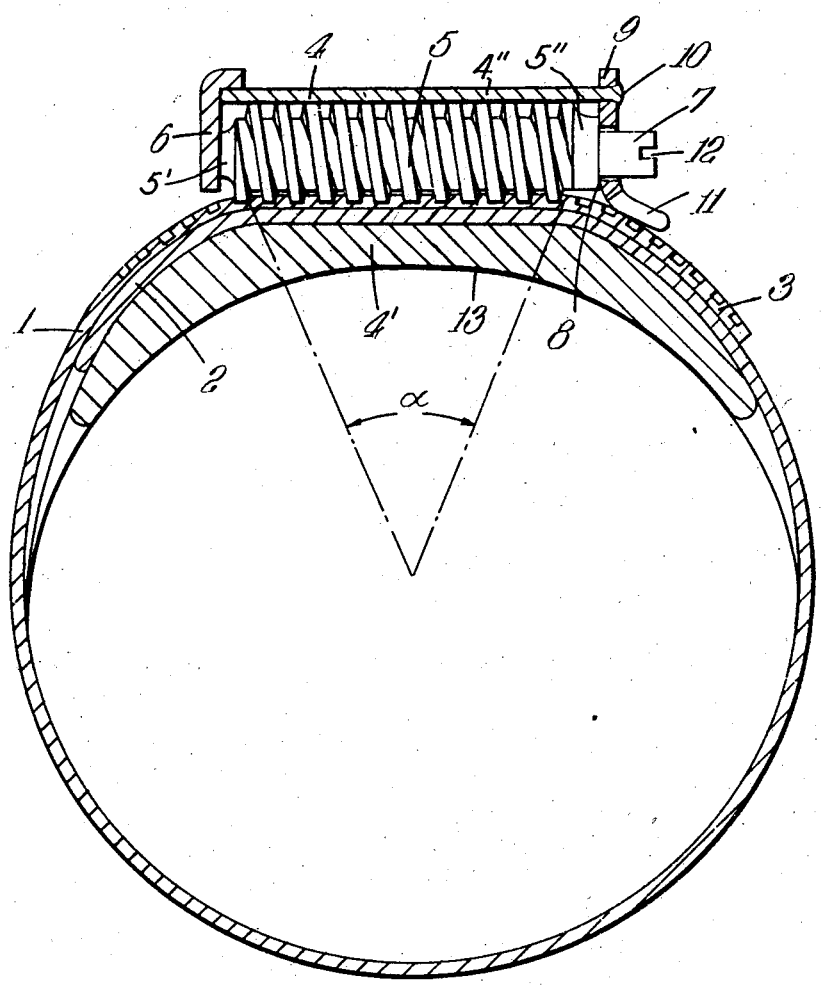

2,384,094

UNITED STATES PATENT OFFICE 2,384,094

CLIP FOR HOSE AND THE LIKE

Robert Cuthbert Scott Jamie, Pathlow, near Stratford-on-Avon, England, assignor of one-half to Hunt & Turner Limited, Birmingham, England, a corporation of Great Britain Application February 25, 1943, Serial No. 477,064
In Great Britain August 19, 1942

5 Claims. (Cl. 24—19)

This invention relates to clips for hoses and the like and whilst the clips are especially applicable for connecting flexible tubular members to rigid tubular members as for example in the water circulating systems of water-cooled engines, such as used on motor cars, the clips are also applicable in any case where the end of flexible tubing is adapted to be connected to a rigid tube or tubular member, or where a clip is to be tightened around an article.

The present invention relates to clips of the type comprising a metal band of which the ends overlap, the outer overlapping end being provided with slots or their equivalent for engagement by a screw rotatably mounted in a housing secured to the other overlapping end, and having means for the rotation thereof.

In known clips of this type the overlapping ends of the band, which are in contact with one another, follow concentric curves and consequently the screw only engages with slots in the outer overlapping end which are located within a small arc, whereby a considerable strain is applied to the screw and slots or their equivalent when the clip is tightened.

It is the object of the present invention to pass the overlapping ends of the band through the housing in such a manner as to enable the screw to engage with substantially all the slots or their equivalent within the casing, whereby the strain, when the clip is tightened, is distributed substantially over the whole of the screw and all the slots or their equivalent inside the housing.

According to the present invention the overlapping ends of the band are caused to pass under the screw or worm along a substantially straight path so that the worm or screw engages with substantially all the slots or their equivalent within the housing.

In order to cause the outgoing overlapping end of the band to follow the curvature of the latter, the housing is preferably provided at its adjacent end with a guide suitably shaped for this purpose.

The screw may be provided with a head for its manipulation, this head being of smaller diameter than the worm or screw.

In order to take up the thrusts of the screw when tightening or slackening the band the housing has secured to one end a cap or plate and to the other a plate or washer through which the head passes or through which an implement may be passed for engagement with a slot in the end of the worm.

This washer or plate is preferably formed integral with the guide.

The invention will now be described by way of example with reference to the accompanying drawings, wherein:

Figure 3 shows a modification of a screw housing in section.

Figure 1:
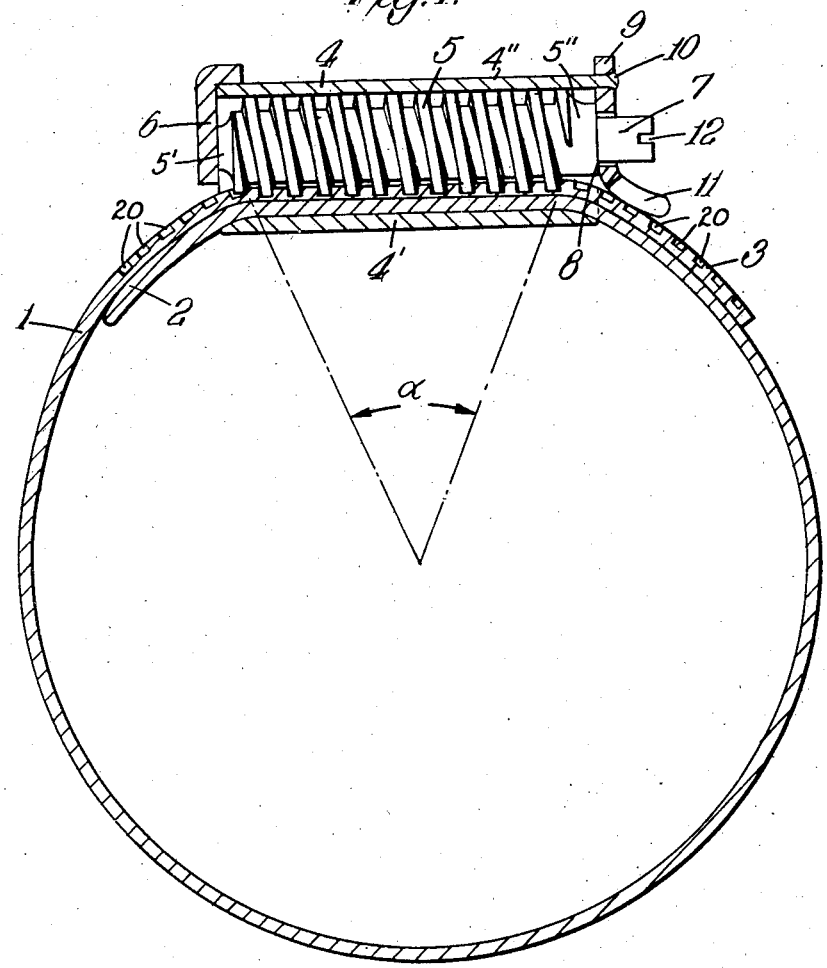
Figure 1 is a side view partly in section, of a clip.
Figure 2:
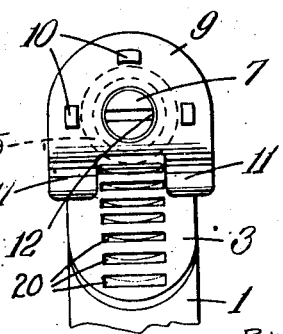
Figure 2 shows the right hand end of the housing of the clip.

As shown in Figure 1 the clip consists of a band of metal 1 with overlapping ends 2, 3. The overlapping end 3 and the adjacent portion of the band 1 passing through a housing 4 is provided with transversely arranged slots 20 or their equivalent for engagement by a worm or screw 5 of which the thread may be square as shown or of other shape, the screw bearing against the inside of the housing 4.

The lower portion 4' of the housing 4 is parallel with the upper portion 4" so that the portions at opposite ends of the band which pass through the housing 4 are constrained to follow a substantially straight path inside the housing 4. As a result of this arrangement the engagement of the worm or screw 5 with the slots or their equivalent in the outer overlapping end 3 and the adjacent portion of the band 1 inside the housing 4 extends over an angle α. As shown the engagement is effected by the screw substantially over its entire length, so that the strain, when the clip is tightened is distributed over the whole of the screw 5.

At its rear end 5' the screw 5 engages by a reduced portion with a plate 6 secured to the end of the housing 4, for example by spot welding. The plate 6 may be flat as shown or arched.

The front end 5" of the screw 5 is provided with a head 7 which is of smaller diameter than the screw 5 so that a shoulder 8 is formed. This shoulder 8 bears against a plate or washer 9 which is secured to the front end of the housing 4 by means of projections 10 extending from the latter. These projections 10 pass through holes in the washer 9 and are then riveted over.

A curved guide 11, which straddles the slots or their equivalent, is formed integral with the washer 9 and serves to bend the outer overlapping end 3, after it leaves the housing 4, downwardly into contact with the band 1.

The head 7 may be of circular cross section and provided with a slot 12 for engagement by a suitable tool or implement, or it may be of square or hexagonal cross section or be provided with oppositely located flats for engagement by a spanner. If desired the head may be omitted, in which case the worm 5 may be provided with a slot which may be engaged by a suitable implement inserted through the hole in the washer 9.

When tightening the band 1 the thrust of the screw 5 is taken up by the plate or cap 6, whilst when slackening the band 1 the thrust is taken up by the plate or washer 9. As the latter thrust is lighter than the thrust when tightening the band the securing of the washer or plate 9 in the manner described is sufficient for the purpose.

If desired the lower side of the housing 4 adapted to be located against the tube or article may be curved as indicated at 13 (Figure 3) or shaped to conform with the surface of the tube or article.

A clip as above described is particularly suitable when made of a large size and of great strength.

I claim:

1. In a clip for tightening a circular metal band having an underlapping end and a transversely slotted overlapping end, the combination with a housing to engage the underlapping band end and a worm rotatably mounted in said housing of a guide plate for said overlapping band end, said guide plate forming part of said housing and including an upper straight surface extending parallel to said worm and having a length at least equal to the threaded part of the latter, the overlapping band end passing between said worm and said guide plate in a straight line whereby all the teeth formed by the thread of the worm engage always equally deep into a corresponding number of slots of said overlapping band end.

2. A clip, as claimed in claim 1, including a guide at the front end of said housing to guide the overlapping end of said band, as it leaves said housing, towards the circular part of said band.

3. A clip, as claimed in claim 1, including a two-armed guide at the front end of said housing, said guide straddling said slots and guiding said overlapping end of said band, as it leaves said housing, towards the circular part of said band.

4. A clip, as claimed in claim 1, including a front plate secured to said housing and a two-armed guide integral with said plate and straddling said slots to guide the overlapping end of the band, as it leaves the housing, towards the circular part of said band.

5. A clip, as claimed in claim 1, wherein the lower face of said guide plate is shaped to conform to the shape of an article against which it is to bear.

ROBERT CUTHBERT SCOTT JAMIE.